United States Patent
Kojima et al.

(10) Patent No.: US 9,171,675 B2
(45) Date of Patent: Oct. 27, 2015

(54) ELECTRICAL STORAGE DEVICE, LITHIUM ION CAPACITOR AND NEGATIVE ELECTRODE FOR LITHIUM ION CAPACITOR

(75) Inventors: Kenji Kojima, Hokuto (JP); Toshihiro Hayashi, Hokuto (JP)

(73) Assignee: JSR CORPORATION, Tokyo (JP)

( * ) Notice: Subject to any disclaimer, the term of this patent is extended or adjusted under 35 U.S.C. 154(b) by 165 days.

(21) Appl. No.: 13/995,206

(22) PCT Filed: Nov. 15, 2011

(86) PCT No.: PCT/JP2011/076230
§ 371 (c)(1),
(2), (4) Date: Jun. 18, 2013

(87) PCT Pub. No.: WO2012/086340
PCT Pub. Date: Jun. 28, 2012

(65) Prior Publication Data
US 2013/0286545 A1    Oct. 31, 2013

(30) Foreign Application Priority Data
Dec. 20, 2010   (JP) .................................. 2010-283301

(51) Int. Cl.
*H01G 9/042* (2006.01)
*H01G 11/06* (2013.01)
*H01G 11/38* (2013.01)
*H01G 11/42* (2013.01)
*H01G 11/32* (2013.01)

(52) U.S. Cl.
CPC .............. *H01G 9/042* (2013.01); *H01G 11/06* (2013.01); *H01G 11/38* (2013.01); *H01G 11/42* (2013.01); *H01G 11/32* (2013.01); *Y02E 60/122* (2013.01); *Y02E 60/13* (2013.01); *Y02T 10/7022* (2013.01)

(58) Field of Classification Search
USPC ................. 361/509, 512, 502–504, 516–519, 361/523–525, 528–529
See application file for complete search history.

(56) References Cited

U.S. PATENT DOCUMENTS

| | | |
|---|---|---|
| 6,246,568 B1 | 6/2001 | Nakao et al. |
| 2008/0220329 A1* | 9/2008 | Kojima et al. ................ 429/188 |
| 2009/0103241 A1* | 4/2009 | Kikuchi et al. ............... 361/502 |

FOREIGN PATENT DOCUMENTS

| | | |
|---|---|---|
| JP | 7-258499 | 10/1995 |
| JP | 8-119615 | 5/1996 |
| JP | 11-102843 | 4/1999 |
| JP | 2009-246137 | 10/2009 |
| JP | 2009-267382 | 11/2009 |
| JP | 2010-98020 | 4/2010 |

OTHER PUBLICATIONS

International Search Report issued Feb. 14, 2012 in Application No. PCT/JP2011/076230.

* cited by examiner

*Primary Examiner* — Nguyen T Ha
(74) *Attorney, Agent, or Firm* — Oblon, McClelland, Maier & Neustadt, L.L.P.

(57) ABSTRACT

An electrical storage device includes a positive electrode, and a negative electrode having a negative electrode active material layer containing a fluorine-containing acrylic binder, the negative electrode active material layer having a density of not less than 0.75 g/cc and not more than 1.10 g/cc.

18 Claims, 1 Drawing Sheet

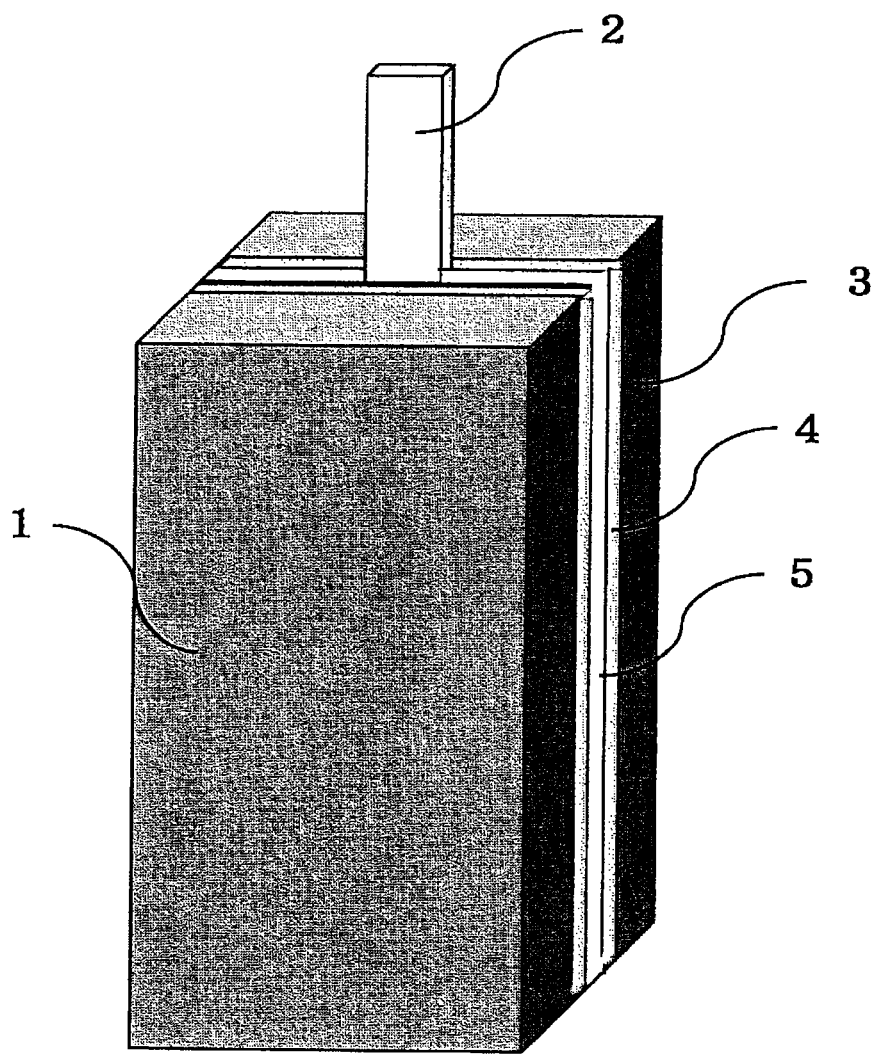

ELECTRICAL STORAGE DEVICE, LITHIUM ION CAPACITOR AND NEGATIVE ELECTRODE FOR LITHIUM ION CAPACITOR

CROSS REFERENCE TO RELATED APPLICATIONS

The present application is a 35 U.S.C. §371 national stage patent application of International patent application PCT/JP2011/076230, filed on Nov. 15, 2011, published as WO/2012/086340 on Jun. 28, 2012, the text of which is incorporated by reference, and claims the benefit of the filing date of Japanese application no. 2010-283301, filed on Dec. 20, 2010, the text of which is also incorporated by reference.

TECHNICAL FIELD

The present invention relates to electrical storage devices including a positive electrode and a negative electrode, lithium ion capacitors, and negative electrodes for lithium ion capacitors.

BACKGROUND ART

As known in the art, electrical storage devices such as lithium ion capacitors which exhibit characteristics including high capacity, high energy density and high output have been recently used in electric vehicles and hybrid vehicles. In a lithium ion capacitor, a negative electrode capable of storing and releasing lithium ions is brought into contact with a lithium ion supply source such as lithium metal to store or carry (to be pre-doped with) lithium ions physically or electrochemically. The pre-doping lowers the negative electrode potential, resulting in a high withstand voltage and a high energy density.

In order to obtain further improvements in the performances of lithium ion capacitors, a lithium ion capacitor is disclosed in which a decrease in resistance is sought by forming a positive electrode using a fluorine-modified acrylic binder (see Patent Literature 1).

Although such lithium ion capacitors exhibit good output characteristics, demands have been placed on a further decrease in resistance as well as on higher capacity and higher reliability in order to achieve greater proliferation of these capacitors.

CITATION LIST

Patent Literature

Patent Literature 1: JP-A-2009-246137

SUMMARY OF INVENTION

Technical Problem

The present invention has been made in view of the circumstances described above. It is therefore an object of the invention to provide electrical storage devices which can be produced with industrial advantages and achieve a higher capacity, a lower resistance and greater reliability.

Solution to Problem

The present inventors carried out studies in order to solve the aforementioned problems. As a result, the present inventors have found that the problems can be solved with an electrical storage device including a negative electrode that has a negative electrode active material layer containing a fluorine-containing acrylic binder and having a specific density. The present invention has been completed based on the finding.

[1] An electrical storage device which includes a positive electrode, and a negative electrode having a negative electrode active material layer containing a fluorine-containing acrylic binder,
the negative electrode active material layer having a density of not less than 0.75 g/cc and not more than 1.10 g/cc.

[2] The electrical storage device described in [1], wherein the fluorine-containing acrylic binder includes a polymer composition including:
Component (a): a fluorine-containing polymer, and
Component (b): an acrylic polymer containing a structural unit derived from an alkyl(meth)acrylate.

[3] The electrical storage device described in [2], wherein the polymer composition includes 5 to 20 mass % of the component (a) and 80 to 95 mass % of the component (b) (wherein the total of the component (a) and the component (b) is 100 mass %).

[4] The electrical storage device described in [2] or [3], wherein the polymer composition has a structure in which the component (a) forms a particulate seed and the component (b) forms an outer shell.

[5] The electrical storage device described in any of [1] to [4], wherein the negative electrode active material layer includes at least one active material selected from the group consisting of graphites, non-graphitizable carbons, graphitizable carbons, cokes and polyacene-based organic semiconductors, the at least one active material having a 50% volume cumulative diameter (D50) in the range of 0.5 to 10 μm.

[6] The electrical storage device described in any of [1] to [5], wherein the electrical storage device is a lithium ion capacitor.

[7] A negative electrode for lithium ion capacitors, which includes a negative electrode active material layer containing a fluorine-containing acrylic binder.

[8] The negative electrode for lithium ion capacitors described in [7], wherein the negative electrode active material layer has a density of not less than 0.75 g/cc and not more than 1.10 g/cc.

[9] The negative electrode for lithium ion capacitors described in [7] or [8], wherein the fluorine-containing acrylic binder includes a polymer composition including:
Component (a): a fluorine-containing polymer, and
Component (b): an acrylic polymer containing a structural unit derived from an alkyl(meth)acrylate.

[10] The negative electrode for lithium ion capacitors described in [9], wherein the polymer composition includes 5 to 20 mass % of the component (a) and 80 to 95 mass % of the component (b) (wherein the total of the component (a) and the component (b) is 100 mass %).

[11] The negative electrode for lithium ion capacitors described in [9] or [10], wherein the polymer composition has a structure in which the component (a) forms a particulate seed and the component (b) forms an outer shell.

[12] The negative electrode for lithium ion capacitors described in any of [7] to [11], wherein the negative electrode active material layer includes at least one active material selected from the group consisting of graphites, non-graphitizable carbons, graphitizable carbons, cokes and polyacene-based organic semiconductors, the at least one active material having a 50% volume cumulative diameter (D50) in the range of 0.5 to 10 μm.

[13] A binder for negative electrode of lithium ion capacitors, which includes a polymer composition including:

Component (a): a fluorine-containing polymer, and

Component (b): an acrylic polymer containing a structural unit derived from an alkyl(meth)acrylate.

[14] The binder for negative electrode of lithium ion capacitors described in [13], wherein the polymer composition includes 5 to 20 mass % of the component (a) and 80 to 95 mass % of the component (b) (wherein the total of the component (a) and the component (b) is 100 mass %).

[15] The binder for negative electrode of lithium ion capacitors described in [13] or [14], wherein the polymer composition has a structure in which the component (a) forms a particulate seed and the component (b) forms an outer shell.

Advantageous Effects of Invention

The electrical storage devices obtained according to the present invention have a high capacity, a high energy density, a high output and a low resistance, and exhibit a high withstand voltage, high durability and high reliability.

BRIEF DESCRIPTION OF DRAWING

FIG. 1 is a schematic view of a positive electrode manufactured in EXAMPLES.

DESCRIPTION OF EMBODIMENTS

The present invention will be described in detail hereinbelow.

《〈Electrical Storage Devices〉》

An electrical storage device according to the invention includes a positive electrode, and a negative electrode having a negative electrode active material layer containing a fluorine-containing acrylic binder and having a density of not less than 0.75 g/cc and not more than 1.10 g/cc.

In the electrical storage devices of the invention, the negative electrode active material layer contains a fluorine-containing acrylic binder. As a result, the inventive electrical storage device has a high capacity, a high energy density, a high output and a low resistance, and exhibits a high withstand voltage, high durability and high reliability.

Examples of the electrical storage devices of the invention include lithium ion primary batteries, lithium ion secondary batteries, electric double layer capacitors and lithium ion capacitors, with lithium ion capacitors being particularly preferable.

The electrical storage device of the invention is preferably configured such that the electrical storage device has an electrical storage element in which a positive electrode having a positive electrode active material layer and a negative electrode having a negative electrode active material layer are stacked or wound together through a separator, and the electrical storage element and an electrolyte (for example, an electrolytic solution, a solid electrolyte or a gel electrolyte) are accommodated in a package. The electrical storage device of the invention may be appropriately optimized by designing.

Here, the term "positive electrode" refers to an electrode into which electrons flow during discharge, and the term "negative electrode" refers to an electrode from which electrons are released during discharge.

〈Negative Electrode〉

The negative electrode used in the inventive electrical storage device has a negative electrode active material layer containing a fluorine-containing acrylic binder and having a density of not less than 0.75 g/cc and not more than 1.10 g/cc.

The negative electrode in the inventive electrical storage device is not particularly limited as long as it has the negative electrode active material layer. However, it is preferable that the negative electrode have the negative electrode active material layer on at least one surface of a collector. The negative electrode may have the negative electrode active material layer directly on the collector or via a conductive layer on the collector.

〈Negative Electrode Active Material Layer〉

The negative electrode active material layer contains a fluorine-containing acrylic binder. For example, the negative electrode active material layer may be obtained by applying a slurry containing a fluorine-containing acrylic binder, a negative electrode active material, a solvent and other optional components to a collector, and drying the coating.

[Fluorine-Containing Acrylic Binder]

The fluorine-containing acrylic binder is not particularly limited as long as it contains a structural unit derived from an acrylic-based monomer, and a fluorine atom. Preferably, the fluorine-containing acrylic binder includes the following specific polymer composition.

[Specific Polymer Composition]

The fluorine-containing acrylic binder preferably includes a polymer composition including:

Component (a): a fluorine-containing polymer, and

Component (b): an acrylic polymer containing a structural unit derived from an alkyl(meth)acrylate. (In the invention, this composition is also referred to as "specific polymer composition".)

The negative electrode active material layer containing such a specific polymer composition advantageously achieves an improvement in redox resistance of the layer and enables a further decrease in resistance of the obtainable electrical storage device. Thus, the fluorine-containing acrylic binder containing such a specific polymer composition may be suitably used, in particular, for a negative electrode for lithium ion capacitors.

The fluorine-containing acrylic binder containing the above specific polymer composition contains a fluorine-containing polymer that is a constituent material of the composition. As a result, the fluorine-containing acrylic binder provides electrochemical stability of the obtainable negative electrode active material layer and negative electrode. Further, the specific acrylic polymer contained therein allows for effective binding between active materials (particularly when the specific polymer composition is particles having a specific 50% volume cumulative diameter described later), resulting in a negative electrode active material layer and a negative electrode which are suppressed from an increase in resistance and exhibit high reliability.

Component (a): Fluorine-Containing Polymer

The component (a) is a fluorine-containing polymer which contains structural units derived from a fluorine-containing monomer at not less than 50 mass % relative to the entirety of the polymer.

Specifically, vinylidene fluoride (a-1) and propylene hexafluoride (a-2) are preferably used as polymerizable monomers to form the component (a) (hereinafter, also referred to as "polymerizable monomers (A)").

In addition to the monomers (a-1) and (a-2), the polymerizable monomers (A) may further include an additional unsaturated monomer (a-3) other than the monomers (a-1) and (a-2).

Examples of such additional unsaturated monomers (a-3) include (meth)acryloyl group-containing compounds such as methyl(meth)acrylate, ethyl(meth)acrylate, n-propyl(meth)acrylate, i-propyl(meth)acrylate, n-butyl(meth)acrylate, i-butyl(meth)acrylate, n-amyl(meth)acrylate, i-amyl(meth)acrylate, n-hexyl(meth)acrylate, 2-ethyl hexyl(meth)acrylate, n-octyl(meth)acrylate, n-nonyl(meth)acrylate, n-decyl (meth)acrylate, ethylene glycol di(meth)acrylate, propylene glycol di(meth)acrylate, trimethylolpropane tri(meth)acrylate, pentaerythritol tetra(meth)acrylate and dipentaerythritol hexa(meth)acrylate; aromatic vinyl compounds such as styrene, α-methylstyrene and divinylbenzene; vinyl esters such as vinyl acetate and vinyl propionate; vinyl halide compounds such as vinyl fluoride, tetrafluoroethylene, vinyl chloride and vinylidene chloride; conjugated dienes such as butadiene, isoprene and chloroprene; ethylene; and functional group-containing unsaturated monomers described later (except (meth)acryloyl group-containing monomers other than (b-1) described later). These additional unsaturated monomers may be used singly, or two or more kinds may be used in combination.

The component (a) is preferably particles. In such a case, the 50% volume cumulative diameter (hereinafter, also referred to as "D50") is preferably 100 to 400 nm, and more preferably 100 to 300 nm.

In the invention, the D50 value is measured with laser diffraction/scattering particle size distribution analyzer "LA-950 V2" (manufactured by HORIBA Ltd.).

The component (a) preferably contains structural units derived from the vinylidene fluoride (a-1) (hereinafter, also referred to as "vinylidene fluoride component") at 80 to 95 mass %, more preferably 80 to 93 mass %, and particularly preferably 82 to 93 mass % with respect to 100 mass % of the entirety of the component (a).

If the proportion of the vinylidene fluoride component is less than the lower limit, the obtainable component (a) tends to exhibit lower compatibility with the component (b). Consequently, separation of layers may occur easily in an embodiment where the specific polymer composition has a composite structure in which the component (a) forms a particulate seed and the component (b) forms an outer shell (hereinafter, such a structure will be also referred to as "complex structure").

If the proportion of the vinylidene fluoride component exceeds the upper limit, seed polymerization of polymerizable monomers to form the component (b) with respect to particulate seeds of the component (a) tends to take place with difficulties. Consequently, separation of layers may occur easily in an embodiment where the specific polymer composition having a complex structure.

The component (a) preferably contains structural units derived from the propylene hexafluoride (a-2) (hereinafter, also referred to as "propylene hexafluoride component") at 2 to 20 mass %, more preferably 5 to 20 mass %, and particularly preferably 7 to 18 mass % with respect to 100 mass % of the entirety of the component (a).

If the proportion of the propylene hexafluoride component is less than the lower limit, seed polymerization of polymerizable monomers to form the component (b) with respect to particulate seeds of the component (a) tends to take place with difficulties. Consequently, separation of layers may occur easily in an embodiment where the specific polymer composition having a complex structure.

If the proportion of the propylene hexafluoride component exceeds the upper limit, the obtainable component (a) tends to exhibit lower compatibility with the component (b). Consequently, separation of layers may occur easily in an embodiment where the specific polymer composition has a complex structure.

Further, the component (a) preferably contains structural units derived from the additional unsaturated monomer (a-3) (hereinafter, also referred to as "additional unsaturated monomer component") at 0 to 18 mass %, more preferably 0 to 13 mass %, and particularly preferably 0 to 10 mass % with respect to 100 mass % of the entirety of the component (a).

If the proportion of the additional unsaturated monomer component in the component (a) exceeds the upper limit, the obtainable component (a) tends to exhibit lower compatibility with the component (b). Consequently, separation of layers may occur easily in an embodiment where the specific polymer composition has a complex structure.

The component (a) may be obtained by polymerizing the polymerizable monomers (A) according to a known method. Emulsion polymerization is a preferable polymerization method.

Component (b): Acrylic Polymer

The component (b) is an acrylic polymer containing structural units derived from an alkyl(meth)acrylate at not less than 50 mass % relative to the entirety of the polymer.

Specifically, an alkyl(meth)acrylate (b-1) and a functional group-containing unsaturated monomer (b-2) are preferably used as polymerizable monomers to form the component (b) (hereinafter, also referred to as "polymerizable monomers (B)").

In addition to the monomers (b-1) and (b-2), the polymerizable monomers (B) may further include an additional unsaturated monomer (b-3) other than the monomers (b-1) and (b-2).

Examples of the alkyl(meth)acrylates (b-1) include compounds represented by Formula (1) below:

$$CH_2=CR^1COOR^2 \qquad \text{Formula (1)}$$

(In Formula (1), $R^1$ represents a hydrogen atom or a methyl group, and $R^2$ represents an alkyl group having 1 to 18 carbon atoms or a cycloalkyl group having 3 to 18 carbon atoms.)

Examples of the compounds represented by Formula (1) include methyl(meth)acrylate, ethyl(meth)acrylate, n-propyl(meth)acrylate, i-propyl(meth)acrylate, n-butyl(meth)acrylate, i-butyl(meth)acrylate, n-amyl(meth)acrylate, i-amyl (meth)acrylate, n-hexyl(meth)acrylate, 2-ethylhexyl(meth)acrylate, n-octyl(meth)acrylate, n-nonyl(meth)acrylate, n-decyl(meth)acrylate, cyclohexyl(meth)acrylate and cyclopentyl(meth)acrylate.

These alkyl(meth)acrylates may be used singly, or two or more kinds may be used in combination.

Examples of the functional group-containing unsaturated monomers (b-2) include unsaturated monomers having functional groups such as carboxyl group, carboxylic acid anhydride group, amide group, amino group, cyano group, epoxy group, sulfonic group and sulfonate group. In addition to these unsaturated monomers, examples of the monomers (b-2) further include (meth)acryloyl group-containing monomers other than the monomers (b-1). Of these, preferred monomers are unsaturated monomers having carboxyl group, amide group, epoxy group, cyano group, sulfonic group or sulfonate group, and (meth)acryloyl group-containing monomers other than the monomers (b-1).

Examples of the unsaturated monomers having a carboxyl group include unsaturated monocarboxylic acids such as acrylic acid, methacrylic acid and crotonic acid; unsaturated polycarboxylic acids such as maleic acid, fumaric acid, itaconic acid, citraconic acid and mesaconic acid; and alkyl esters and amides having free carboxyl groups of the above unsaturated polycarboxylic acids.

Examples of the unsaturated monomers having a carboxylic acid anhydride group include anhydrides of the above unsaturated polycarboxylic acids.

Examples of the unsaturated monomers having an amide group include unsaturated carboxylic acid amides such as (meth)acrylamide, α-chloroacrylamide, N,N'-methylene (meth)acrylamide, N,N'-ethylene(meth)acrylamide, N-hydroxymethyl(meth)acrylamide, N-2-hydroxyethyl(meth) acrylamide, N-2-hydroxypropyl(meth)acrylamide, N-3-hydroxypropyl(meth)acrylamide, crotonic acid amide, maleic acid diamide and fumaric acid diamide.

Examples of the unsaturated monomers having an amino group include aminoalkyl esters of unsaturated carboxylic acids such as 2-aminomethyl(meth)acrylate, 2-methylaminomethyl(meth)acrylate, 2-dimethylaminomethyl(meth) acrylate, 2-aminoethyl(meth)acrylate, 2-methylaminoethyl (meth)acrylate, 2-ethylaminoethyl(meth)acrylate, 2-dimethylaminoethyl(meth)acrylate, 2-diethylaminoethyl (meth)acrylate, 2-n-propylaminoethyl(meth)acrylate, 2-n-butylaminoethyl(meth)acrylate, 2-aminopropyl(meth)acrylate, 2-methylaminopropyl(meth)acrylate, 2-dimethylaminopropyl(meth)acrylate, 3-aminopropyl (meth)acrylate, 3-methylaminopropyl(meth)acrylate and 3-dimethylaminopropyl(meth)acrylate; and N-aminoalkyl derivatives of unsaturated carboxylic acid amides such as N-dimethylaminomethyl(meth)acrylamide, N-2-aminoethyl (meth)acrylamide, N-2-methylaminoethyl(meth)acrylamide, N-2-ethylaminoethyl(meth)acrylamide, N-2-dimethylaminoethyl(meth)acrylamide, N-2-diethylaminoethyl (meth)acrylamide, N-3-aminopropyl(meth)acrylamide, N-3-methylaminopropyl(meth)acrylamide and N-3-dimethylaminopropyl(meth)acrylamide.

Examples of the unsaturated monomers having a cyano group include unsaturated nitriles such as (meth)acrylonitrile, α-chloroacrylonitrile and vinylidene cyanide; and cyanoalkyl esters of unsaturated carboxylic acids such as 2-cyanoethyl(meth)acrylate, 2-cyanopropyl(meth)acrylate and 3-cyanopropyl(meth)acrylate.

Examples of the unsaturated monomers having an epoxy group include unsaturated group-containing glycidyl compounds such as glycidyl(meth)acrylate and (meth)allyl glycidyl ether.

Examples of the unsaturated monomers having a sulfonic group or a sulfonate group include 2-acrylamido-2-methylpropanesulfonic acid, styrenesulfonic acid (salt) and isoprenesulfonic acid (salt).

Examples of the (meth)acryloyl group-containing monomers other than the monomers (b-1) include ethylene glycol di(meth)acrylate, propylene glycol di(meth)acrylate, trimethylolpropane tri(meth)acrylate, pentaerythritol tetra(meth) acrylate, dipentaerythritol hexa(meth)acrylate and 2,2,2-trifluoroethyl methacrylate.

The functional group-containing unsaturated monomers may be used singly, or two or more kinds may be used in combination.

Examples of the additional unsaturated monomers (b-3) include the aromatic vinyl compounds, the vinyl esters, the conjugated dienes and ethylene mentioned as the additional unsaturated monomers (a-3).

The additional unsaturated monomers may be used singly, or two or more kinds may be used in combination.

The component (b) preferably contains structural units derived from the alkyl(meth)acrylate (b-1) (hereinafter, also referred to as "alkyl(meth)acrylate component") at 50 to 98 mass %, more preferably 60 to 95 mass %, and particularly preferably 70 to 90 mass % with respect to 100 mass % of the entirety of the component (b).

If the proportion of the alkyl(meth)acrylate component is less than the lower limit, the obtainable component (b) tends to exhibit lower compatibility with the component (a). Consequently, separation of layers may occur easily in an embodiment where the specific polymer composition has a complex structure. If the proportion of the alkyl(meth)acrylate component exceeds the upper limit, there is a risk that the obtainable specific polymer composition is swollen to an excessively large volume in a slurry used for the production of the negative electrode.

In the specific polymer composition, in particular, it is preferable that the component (b) contains structural units derived from methyl methacrylate (hereinafter, also referred to as "methyl methacrylate component") that are an alkyl (meth)acrylate component. When the component (b) contains the methyl methacrylate component, the proportion of the methyl methacrylate component is preferably 10 to 35 mass %, more preferably 15 to 33 mass %, and particularly preferably 20 to 30 mass % with respect to 100 mass % of the entirety of the component (b).

If the proportion of the methyl methacrylate component is less than the lower limit, the obtainable component (b) tends to exhibit lower compatibility with the component (a). Consequently, separation of layers may occur easily in an embodiment where the specific polymer composition has a complex structure. If the proportion of the methyl methacrylate component exceeds the upper limit, there is a risk that the obtainable specific polymer composition is swollen to an excessively large volume in a slurry used for the production of the negative electrode.

The component (b) preferably contains structural units derived from the functional group-containing unsaturated monomer (b-2) (hereinafter, also referred to as "functional group-containing unsaturated monomer component") at 0.1 to 20 mass %, more preferably 0.5 to 18 mass %, and particularly preferably 0.8 to 15 mass % with respect to 100 mass % of the entirety of the component (b).

If the proportion of the functional group-containing unsaturated monomer component is less than the lower limit, there is a risk that the obtainable specific polymer composition is poor in chemical stability, making it difficult to form a satisfactory aqueous dispersion. If the proportion of the functional group-containing unsaturated monomer component exceeds the upper limit, the obtainable specific polymer composition may exhibit an excessively high viscosity and become aggregated, possibly making it difficult to form a satisfactory aqueous dispersion.

The component (b) preferably contains structural units derived from the additional unsaturated monomer (b-3) (hereinafter, also referred to as "additional unsaturated monomer component") at 0 to 49.9 mass %, more preferably 0 to 30 mass %, and particularly preferably 0 to 20 mass % with respect to 100 mass % of the entirety of the component (b).

If the proportion of the additional unsaturated monomer component in the component (b) exceeds the upper limit, the obtainable component (b) tends to exhibit lower compatibility with the component (a). Consequently, separation of layers may occur easily in an embodiment where the specific polymer composition has a complex structure.

The component (b) may be obtained by polymerizing the polymerizable monomers (B) according to a known method. Emulsion polymerization is a preferable polymerization method.

Contents of Component (a) and Component (b)

The content of the component (a) in the specific polymer composition is preferably 5 to 20 mass %, and more preferably 8 to 15 mass % (wherein the total of the component (a) and the component (b) is 100 mass %). When the specific polymer composition contains the component (a) in the above range, the obtainable binder exhibits excellent properties such as chemical resistance and can give a negative electrode active material layer having excellent redox resistance. Further, the above content ensures that the obtainable electrical storage device is suppressed from a decrease in capacitance and exhibits good cycle characteristics.

The contents of the components in the specific polymer composition may be determined based on the amounts of materials used or by analyzing the obtained composition by a fluorescent X-ray measurement.

If the specific polymer composition contains the fluorine-containing polymer at below the lower limit, there are risks that the obtainable binder is poor in properties such as chemical resistance as well as that the obtainable negative electrode active material layer is poor in redox resistance. If the specific polymer composition contains the fluorine-containing polymer at above the upper limit, there are risks that the obtainable binder exhibits a lower binding power as well as that the final electrical storage device decreases capacitance and fails to achieve good cycle characteristics when the electrical storage device is discharged at high speed.

The content of the component (b) in the specific polymer composition is preferably 80 to 95 mass %, and more preferably 85 to 92 mass % (wherein the total of the component (a) and the component (b) is 100 mass %). When the specific polymer composition contains the component (b) in the above range, the obtainable negative electrode active material layer exhibits good adhesion with respect to a collector.

Configurations Such as Structure of Specific Polymer Composition

The specific polymer composition preferably has a complex structure formed by the component (a) and the component (b), and is preferably particles. In detail, it is preferable that the specific polymer composition be particles having a complex structure which are obtained by subjecting particles of the component (a) as seeds to seed polymerization of the polymerizable monomers (B) to form outer shells of the component (b).

In the case where the specific polymer composition is particles having a complex structure, the D50 of the particles is preferably less than 1/3 of the D50 of an active material which may be bound therewith, and is more preferably 100 to 600 nm, and particularly preferably 100 to 400 nm.

When the specific polymer composition is particles having a complex structure, the above D50 value of the particles ensures that particles of an active material can be bound effectively. As a result, the obtainable electrical storage device exhibits low resistance and high reliability and is producible with industrial advantages.

If the D50 of the specific polymer composition is less than the lower limit, there is a risk that aggregates occur frequently due to unstable dispersibility during the production of the negative electrode or during the preparation of a slurry used for the negative electrode production. If the D50 of the specific polymer composition exceeds the upper limit, the obtainable fluorine-containing acrylic binder comes to contact an active material at an insufficient number of binding points, possibly resulting in poor adhesion of the active material with respect to a collector.

Preparation of Specific Polymer Composition

The specific polymer composition may be prepared by any known method without limitation. For example, a method disclosed in JP-A-H07-258499 may be preferably utilized.

In detail, the specific polymer composition may be prepared by seed polymerization of the polymerizable monomers (B) with respect to particulate seeds of the component (a). Preferably, the polymer composition is obtained by the following method ((1) and (2)).

(1) The polymerizable monomers (A) for the component (a) are subjected to emulsion polymerization to give a particulate fluorine-containing polymer (particles).

(2) Subsequently, the polymerizable monomers (B) for the component (b) are subjected to emulsion polymerization in the presence of the above particles. Thus, particles are obtained which have a complex structure in which the component (b) forms outer shells.

⟨Methods for Producing Negative Electrode⟩

For example, the negative electrode may be produced by a method in which a slurry containing the fluorine-containing acrylic binder, a negative electrode active material, a solvent and other optional components is applied to a substrate such as a collector and is dried to form a negative electrode having a negative electrode active material layer; a method in which a conductive layer is provided on a collector beforehand and the above slurry is applied onto the conductive layer and is dried to form a negative electrode having a negative electrode active material layer; or a method in which a sheet-shaped negative electrode active material layer is formed beforehand and is attached to a collector with an adhesive, preferably with a conductive adhesive, to form a negative electrode having the negative electrode active material layer.

[Slurry]

The slurry containing the fluorine-containing acrylic binder that is used for the formation of the negative electrode active material layer preferably contains the fluorine-containing acrylic binder, a negative electrode active material, a solvent, and an optional conductive agent and optional components. These components will be described below.

The solid concentration in the slurry is preferably 35 to 70 mass %, and more preferably 40 to 65 mass %. When the solid concentration in the slurry is in this range, a negative electrode active material layer having a density in the aforementioned range can be formed easily.

[Fluorine-Containing Acrylic Binder]

From the viewpoints of the redox resistance of the negative electrode active material layer and the easiness in the production of the negative electrode active material layer, it is preferable that the slurry containing the fluorine-containing acrylic binder be a dispersion in which the specific polymer composition is dispersed in a solvent.

The amount of the fluorine-containing acrylic binder added may vary in accordance with, for example, the electrical conductivity of a negative electrode active material and the shape of the negative electrode to be formed. However, it is preferable that the fluorine-containing acrylic binder be added to the slurry in a ratio of 1 to 20 parts by mass, and more preferably 1.5 to 10 parts by mass in terms of the solid content in the binder relative to 100 parts by mass of a negative electrode active material.

The content in terms of solid of the specific polymer composition in the slurry is preferably 1 to 30 mass %, and more preferably 1 to 20 mass %.

[Negative Electrode Active Material]

The slurry contains a negative electrode active material. The negative electrode active material is not particularly limited. When the electrical storage device is a lithium ion capacitor or a lithium ion secondary battery, however, the negative electrode active material is preferably a material capable of being reversibly doped with lithium ions. Examples of such negative electrode active materials include carbon materials such as graphites, non-graphitizable carbons, graphitizable carbons and cokes, as well as polyacene organic semiconductors (PAS) which are heat-treated products of aromatic type condensation polymers having a polyacene-type skeleton structure with a hydrogen/carbon atomic ratio of 0.05 to 0.50.

These negative electrode active materials may be used singly, or two or more kinds may be used in combination. In particular, graphites are preferable because the obtainable electrical storage device exhibits low resistance.

Because the PAS has an amorphous structure, doping and dedoping of lithium ions do not cause any structural changes such as swelling or shrinkage. Thus, an electrical storage device obtained using the PAS, in particular a lithium ion capacitor or a lithium ion secondary battery, achieves excellent cycle characteristics. Further, the isotropy of the molecular structure (higher-order structure) of the PAS is not affected by the doping and dedoping of lithium ions. Thus, the obtainable lithium ion capacitor or lithium ion secondary battery is capable of quick charging and quick discharging.

The aromatic type condensation polymer that is a precursor of PAS is preferably a condensate formed between an aromatic hydrocarbon compound and an aldehyde. Examples of the aromatic hydrocarbon compounds include phenols such as phenol, cresol and xylenol; methylene bisphenols represented by Formula (2) below; hydroxybiphenyls; and hydroxynaphthalenes.

[Chem. 1]

General Formula (2)

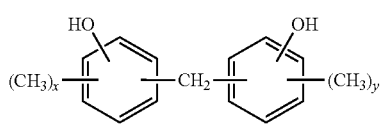

In Formula (2), x and y are each independently an integer of 0 to 2.

For example, particularly when the electrical storage device of the invention is a lithium ion capacitor, the negative electrode active material preferably has a D50 in the range of 0.5 to 10 μm, more preferably 2 to 7 μm, and still more preferably 4 to 6 μm.

If the D50 of the negative electrode active material is less than the lower limit, such an active material tends to become aggregated to increase the viscosity of the slurry and make handling of the slurry difficult. If the D50 of the negative electrode active material exceeds the upper limit, the outer surface area of the negative electrode active material layer tends to be smaller and the output characteristics of the lithium ion capacitor may be deteriorated.

When the electrical storage device of the invention is a lithium ion secondary battery, the use of a negative electrode active material having the above D50 value is possible. However, it is preferable to use a material having a larger value, in particular 10 μm or more, due to reasons such as because side reactions are unlikely to occur during charging and discharging.

In order to improve the output and to enhance the coulombic efficiency (discharge capacity/charge capacity) of the electrical storage device, graphite having a D50 in the above range is preferably used as the negative electrode active material. The use of such graphite is particularly preferable when the negative electrode is used in a lithium ion capacitor.

The negative electrode active material preferably has a specific surface area in the range of 0.1 to 2000 m$^2$/g, more preferably 0.1 to 1000 m$^2$/g, and still more preferably 0.1 to 600 m$^2$/g.

The content of the negative electrode active material is preferably 30 to 70 mass %, and more preferably 35 to 70 mass % relative to 100 mass % of the slurry.

[Solvent]

The solvent is not particularly limited. From the viewpoints of, for example, the prevention of deteriorations in electric characteristics of the negative electrode active material layer and the easiness in production, compounds that are evaporated at a low temperature are preferable, with examples including water. The solvent is preferably used in such an amount that the solid concentration in the slurry will be within the aforementioned range.

[Conductive Agent]

Examples of the conductive agents include acetylene black, Ketjen black, furnace black, channel black, lamp black, graphite and metal powders. These conductive agents may be used singly, or two or more kinds may be used in combination.

The amount of the conductive agent added to the slurry may vary in accordance with, for example, the electrical conductivity of the negative electrode active material and the shape of the negative electrode to be formed. However, the amount is preferably 1 to 20 parts by mass, and more preferably 1.5 to 20 parts by mass with respect to 100 parts by mass of the negative electrode active material.

[Optional Components]

The slurry which contains the fluorine-containing acrylic binder may further contain optional components in accordance with desired purposes. When the slurry contains such optional components, the content of the optional components is preferably 0.5 to 20 mass %, and more preferably 0.5 to 10 mass % relative to 100 mass % of the slurry.

Examples of such optional components include polysaccharides such as starch, polyvinyl alcohol, carboxymethyl cellulose, hydroxypropyl cellulose, regenerated cellulose and diacetyl cellulose; thermoplastic resins such as polyvinyl chloride, polyvinylpyrrolidone, polytetrafluoroethylene, polyvinylidene fluoride, polyethylene, polypropylene and polyethylene oxide; rubber elastic polymers such as ethylene-propylene-diene terpolymer (EPDM), sulfonated EPDM, styrene butadiene rubber, polybutadiene and fluororubber; and mixtures of these compounds. Of these, carboxymethyl cellulose is preferable. The carboxymethyl cellulose preferably has a number average molecular weight of 200,000 to 5,000,000, and more preferably 500,000 to 2,000,000. The degree of etherification is preferably 0.5 to 1.0, and more preferably 0.6 to 0.8.

Further, other components such as pH adjusters and anti-foaming agents may be used as the optional components.

These optional components may be used singly, or two or more kinds may be used in combination.

[Collector]

The collector is not particularly limited provided that it has excellent electron conductivity. Various collectors commonly used in devices such as batteries may be used, with those having throughholes extending between the front and the back surfaces being preferable. Exemplary materials for the negative electrode collector include stainless steel, copper and nickel. In the case where higher capacity lithium ion capacitors are to be produced, it is preferable to use a porous collector having throughholes extending between the front and the back surfaces. Specific examples of such porous collectors include expanded metals, punched metals, metal meshes, foams, and porous foils having etched throughholes. The configurations such as shape and number of throughholes of these porous collectors are not particularly limited, but are preferably such that ions such as lithium ions in an electrolytic solution described later can move between the front and the back sides of the negative electrode without being blocked by the collector.

The thickness of the collector is preferably 10 to 50 μm, and more preferably 20 to 50 μm. The open area ratio of the collector is preferably 30 to 70%, and more preferably 40 to 60%.

[Configurations Such as Structure of Negative Electrode Active Material Layer]

The negative electrode active material layer forming the negative electrode contains the fluorine-containing acrylic binder and has a density of not less than 0.75 g/cc and not more than 1.10 g/cc.

The negative electrode active material layer having the above density exhibits a high retention ability with respect to an electrolytic solution and also has a low contact resistance associated with the active material to allow higher electron mobility. Thus, the electrical storage device achieves a high capacity and a low resistance.

Further, the above density of the negative electrode active material layer ensures that lithium ions may be introduced into the layer easily. Thus, the electrical storage device achieves a high capacity and a low resistance.

If the density of the negative electrode active material layer is less than the lower limit, the contact area tends to be reduced within the active material in the negative electrode active material layer as well as between the active material and the collector unless a larger amount of the active material is added to the negative electrode active material layer. As a result, the contact resistance between the active material and the collector tends to be increased.

Further, the contact resistance associated with the active material tends to be increased if the density of the negative electrode active material layer is less than the lower limit, although the retention ability with respect to an electrolytic solution is increased. Furthermore, such a negative electrode active material layer tends to exhibit lower adhesion with respect to the collector, possibly resulting in a decrease in the durability of the electrical storage device.

If the density of the negative electrode active material layer exceeds the upper limit, the impregnation of the negative electrode active material layer with an electrolytic solution becomes difficult due to such an excessively high density of the negative electrode active material layer, resulting in a decrease in ion conductivity. Thus, it may be difficult to obtain desired electric characteristics.

Further, the negative electrode active material layer having a density in excess of the upper limit exhibits a lower capability of being impregnated with an electrolytic solution with the result that the output of the electrical storage device may be lowered.

The density of the negative electrode active material layer may be defined as follows. Here, the density of the negative electrode active material layer refers to the density of the entirety of the negative electrode active material layer provided on the collector.

Samples (E) and (F) described below are cut to circles 16 mm in diameter. The thickness is measured with a thickness meter (manufactured by Mitutoyo Corporation: DGE-702).

The total thickness $d_G$ of a negative electrode active material layer formed on a collector is determined by Equation (i) below.

Sample (E): a multilayer structure having a negative electrode active material layer on a collector Sample (F): a collector alone total thickness $d_G$ of negative electrode active material layer (mm)=$d_E$−$d_F$       Equation (i)

(In Equation (i), $d_E$ (mm) represents the thickness of the sample (E) and $d_F$ (mm) represents the thickness of the sample (F). The collectors used in the samples (E) and (F) are identical collectors. If the negative electrode active material layer is provided on the collector via a conductive layer, the sample (F) is a "multilayer structure having a conductive layer on a collector".)

In the case where the collectors of the samples (E) and (F) are porous foils having an open area ratio of α% and, in the sample (E), the portions of the opening are filled with the negative electrode active material layer (which is confirmed by SEM), $d_F$ is replaced by the converted thickness $d_{F'}$, according to the following equation based on 0% open area ratio, and $d_G$ is calculated from ($d_E$−$d_{F'}$).

Converted thickness $d_{F'}$=$d_F$×(100−α)/100

The open area ratio of the collector is calculated according to Equation (1) below.

Open area ratio (%)=[1−(mass of collector/true specific gravity of collector)/(apparent volume of collector)]×100       Equation (1)

Next, the volume $V_G$ of the negative electrode active material layer formed on the collector is determined from Equation (ii) below.

volume $V_G$ of negative electrode active material layer (mm$^3$)=$d_G$×64π       Equation (ii)

Next, the mass $G_G$ (g) of the negative electrode active material layer formed on the collector is obtained by subtracting the mass of the sample (F) from the mass of the sample (E). The density X of the negative electrode active material layer is obtained from Equation (iii) below.

density X of negative electrode active material layer (g/cc)=$G_G$/$V_G$×10$^6$       Equation (iii)

The negative electrode having the negative electrode active material layer with a density in the above range may be formed by applying the slurry containing the fluorine-containing acrylic binder to a substrate such as a collector and drying the coating to form the negative electrode active material layer, or by attaching a preliminarily formed sheet of the negative electrode active material layer to a substrate such as a collector. A pressure may be applied to the formed layer so as to adjust the density to a desired density.

The thickness of the negative electrode active material layer is not particularly limited and may be selected appropriately in accordance with desired purposes. However, the thickness is preferably 10 to 200 μm, and more preferably 10 to 100 μm.

[Content of Fluorine-Containing Acrylic Binder]

The content of the fluorine-containing acrylic binder is not particularly limited, but is preferably 1 to 20 mass %, and more preferably 3 to 15 mass % relative to 100 mass % of the entirety of the negative electrode active material layer.

If the content of the fluorine-containing acrylic binder is less than the lower limit, the adhesion of the active material to the collector tends to be lowered and the negative electrode active material layer is apt to become separated from the collector. Thus, there is a risk that the negative electrode active material layer and the negative electrode fail to achieve high reliability. If the content of the fluorine-containing acrylic binder exceeds the upper limit, the adhesion with respect to the collector is improved but the resistance tends to be increased. Thus, the electrical storage device may fail to achieve a high output density and a high energy density.

[Content of Negative Electrode Active Material]

The content of the negative electrode active material is not particularly limited, but is preferably 80 to 95 mass %, and more preferably 85 to 95 mass % relative to 100 mass % of the entirety of the negative electrode active material layer. If the content of the negative electrode active material is less than the lower limit, the electrical storage device may fail to achieve a high withstand voltage and a high energy density.

⟨Positive Electrode⟩

The positive electrode used in the inventive electrical storage device is not particularly limited and may be any of known electrodes used in electrical storage devices.

The positive electrode preferably has a positive electrode active material layer on at least one surface of a collector. The positive electrode active material layer may be provided directly on the collector or via a conductive layer on the collector.

When it is expected that resistance is increased due to, for example, the formation of an oxide film on the collector used, the formation of such a conductive layer is preferable in order to reduce the resistance.

⟨Methods for Producing Positive Electrode⟩

The positive electrode is preferably produced from materials including a collector, a positive electrode active material and a binder.

For example, the positive electrode may be produced by a method in which a binder, a positive electrode active material, and an optional conductive agent and optional components as required are dispersed in an aqueous medium to give a slurry, and the slurry is applied onto a collector and dried to form a positive electrode having a positive electrode active material layer; a method in which a conductive layer is provided on a collector beforehand, and the above slurry is applied onto the conductive layer and dried to form a positive electrode having a positive electrode active material layer; or a method in which a sheet-shaped positive electrode active material layer is formed beforehand and is attached to a collector to form a positive electrode having the positive electrode active material layer.

[Binder]

Examples of the binders which may be used for the production of the positive electrode include the aforementioned fluorine-containing acrylic binder, as well as rubber type binders such as styrene-butadiene rubber (SBR) and nitrile rubber (NBR); fluoro-type resins such as polyethylene tetrafluoride and polyvinylidene fluoride; and thermoplastic resins such as polypropylene, polyethylene and polyacrylate. Of these, the fluorine-containing acrylic binder is preferably used from the viewpoints of output characteristics and low resistance.

The amount of the binder used may vary in accordance with, for example, the electrical conductivity of a positive electrode active material and the shape of the positive electrode to be formed. However, the amount thereof relative to the positive electrode active material is preferably 1 to 20 mass %, and more preferably 2 to 10 mass % in terms of solid content.

[Positive Electrode Active Material]

The positive electrode active material is preferably a material capable of being reversibly doped with lithium ions and/or anions such as tetrafluoroborate.

In the case where the electrical storage device is a lithium ion capacitor, the positive electrode active material may be any of various materials, preferably activated carbon or the PAS described above, and particularly preferably activated carbon.

When the electrical storage device is a lithium ion secondary battery, materials such as iron lithium phosphate, lithium cobaltate, lithium manganate, lithium nickelate and ternary lithium nickel-cobalt-manganate may be suitably used.

The positive electrode active material preferably has a broad grain size distribution. The D50 thereof is preferably not less than 2 μm, more preferably 2 to 50 μm, and particularly preferably 2 to 20 μm.

Further, the positive electrode active material preferably has an average pore diameter of not more than 10 nm, and a specific surface area of 600 to 3000 $m^2/g$, and more preferably 1300 to 2500 $m^2/g$.

[Conductive Agent]

Examples of the conductive agents optionally used in the production of the positive electrode include the aforementioned optional conductive agents used for the production of the negative electrode. The amount of the conductive agent used may be similar as described above.

[Optional Components]

Components such as the optional components which may be added to the fluorine-containing acrylic binder may be used as the optional components.

[Collector]

The collector which may be used in the production of the positive electrode is not particularly limited provided that it has excellent electron conductivity. Various collectors commonly used in batteries may be used, with those having throughholes extending between the front and the back surfaces being preferable. Exemplary materials for the positive electrode collector include aluminum and stainless steel. In the case where higher capacity lithium ion capacitors are to be produced, it is preferable to use a porous collector having throughholes extending between the front and the back surfaces. Specific examples of such porous collectors include expanded metals, punched metals, metal meshes, foams, and porous foils having etched throughholes. The configurations such as shape and number of throughholes of these porous collectors are not particularly limited, but are preferably such that ions such as lithium ions in an electrolytic solution described later can move between the front and the back sides of the positive electrode without being blocked by the collector.

The thickness of the collector is preferably 10 to 50 and more preferably 15 to 50 μm. The open area ratio of the collector is preferably 30 to 70%, and more preferably 40 to 60%.

⟨⟨Lithium Ion Capacitor⟩⟩

The electrical storage device of the invention is preferably a lithium ion capacitor. The lithium ion capacitor preferably has a cell structure realizing a high capacity. Examples of such capacitors include stacked cells in which three or more layers of each of sheet-shaped positive electrodes and negative electrodes are stacked on top of one another via separators; wound cells in which a multilayer structure having positive electrode and negative electrode strips stacked via separators is wound via a separator such that the adjacent positive and negative electrodes do not contact with each other; and film cells in which a stacked cell is sealed in an exterior film.

The lithium ion capacitor preferably includes the positive and negative electrodes, and an electrolyte through which lithium ions can be transferred. The lithium ion capacitor more preferably includes a capacitor cell in which the positive electrode is such that a positive electrode active material capable of being reversibly doped with lithium ions and/or anions is bound with a binder to a collector having throughholes extending between the front and the back surfaces; the negative electrode is such that a negative electrode active material capable of being reversibly doped with lithium ions is bound with the fluorine-containing acrylic binder to a collector having throughholes extending between the front and the back surfaces; and the positive electrode and/or the negative electrode is electrochemically doped with lithium.

The doping with lithium ions may be performed for one or both of the negative electrode and the positive electrode, and may be preferably performed for the negative electrode alone.

A particularly high capacity and low resistance may be achieved with the above lithium ion capacitor in which the negative electrode and/or the positive electrode reversibly carries (is doped with) lithium ions.

Due to the fact that the negative electrode contains the fluorine-containing acrylic binder, particles of the active material are bound together effectively. Thus, lithium ion capacitors which are suppressed from an increase in resistance and exhibit a high capacity can be produced with industrial advantages.

⟨Electrolyte⟩

The electrolyte is usually used as an electrolytic solution in which electrolyte is dissolved in a solvent. The electrolyte is not particularly limited as long as the substance can form lithium ions. Specific examples include $LiClO_4$, $LiAsF_6$, $LiBF_4$, $LiPF_6$, $LiN(C_2F_5SO_2)_2$, $LiN(CF_3SO_2)_2$ and $LiN(FSO_2)_2$.

The solvent for dissolving the electrolyte is preferably an aprotic organic solvent. Examples of such aprotic organic solvents include ethylene carbonate, propylene carbonate, 1-fluoroethylene carbonate, 1-(trifluoromethyl)ethylene carbonate, dimethyl carbonate, diethyl carbonate, methyl ethyl carbonate, γ-butyrolactone, acetonitrile, dimethoxyethane, tetrahydrofuran, dioxolane, methylene chloride and sulfolane. These solvents may be used singly, or two or more kinds may be used in combination.

In order to reduce the internal resistance by the electrolytic solution, the concentration of the electrolyte in the electrolytic solution is preferably at least 0.1 mol/L or above, and more preferably in the range of 0.5 to 1.5 mol/L.

Although the electrolyte may be usually used in a liquid form as described above, a gel or solid electrolyte may be prepared in order to prevent leakage.

⟨Separator⟩

The separator is preferably a substance which provides electrical insulation between the positive and negative electrodes and retains the electrolyte (the electrolytic solution). Examples include nonwoven fabrics and porous films made of substances such as cellulose, rayon, polyethylene, polypropylene, aramid resin, polyamideimide, polyphenylene sulfide, polyimide and cellulose/rayon. The thickness of the separator is not particularly limited, but may be, for example, 20 μm to 50 μm.

⟨⟨Lithium Ion Secondary Battery⟩⟩

In an exemplary lithium ion secondary battery, a container such as a can or a laminate film seals, together with an electrolytic solution, a cell such as a stacked cell in which sheet-shaped positive and negative electrodes are stacked on top of one another via separators, or a wound cell in which a multilayer structure having positive and negative electrode strips stacked via separators is wound via a separator such that the adjacent positive and negative electrodes do not contact with each other.

⟨Electrolytic Solution⟩

The electrolytic solution in the lithium ion secondary battery may be a solution of a lithium compound electrolyte in a solvent.

Specific examples of the electrolytes include $LiClO_4$, $LiBF_4$, $LiI$, $LiPF_6$, $LiCF_3SO_3$, $LiAsF_6$, $LiSbF_6$, $LiAlCl_4$, $LiCl$, $LiBr$, $LiB(C_2H_5)_4$, $LiCH_3SO_3$, $LiC_4F_9SO_3$ and $Li(CF_3SO_2)_2N$.

Specific examples of the solvents include carbonates such as propylene carbonate, ethylene carbonate, butylene carbonate, dimethyl carbonate, diethyl carbonate and methyl ethyl carbonate; lactones such as γ-butyrolactone; ethers such as trimethoxysilane, 1,2-dimethoxyethane, diethyl ether, 2-ethoxyethane, tetrahydrofuran and 2-methyltetrahydrofuran; sulfoxides such as dimethylsulfoxide; oxolanes such as 1,3-dioxolane and 4-methyl-1,3-dioxolane; nitrogen-containing compounds such as acetonitrile and nitromethane; esters such as methyl formate, methyl acetate, butyl acetate, methyl propionate, ethyl propionate and phosphoric triester; glymes such as diglyme, triglyme and tetraglyme; ketones such as acetone, diethyl ketone, methyl ethyl ketone and methyl isobutyl ketone; sulfones such as sulfolane; oxazolidinones such as 2-methyl-2-oxazolidinone; and sultones such as 1,3-propane sultone, 1,4-butane sultone, 2,4-butane sultone and 1,8-naphtha sultone.

⟨Separator⟩

Examples of the separators include those separators which may be used for the lithium ion capacitors.

⟨⟨Electric Double Layer Capacitor⟩⟩

In an exemplary electric double layer capacitor, a container such as a can or a laminate film seals, together with an electrolytic solution, a cell such as a stacked cell in which sheet-shaped positive and negative electrodes are stacked on top of one another via separators, or a wound cell in which a multilayer structure having positive and negative electrode strips stacked via separators is wound via a separator such that the adjacent positive and negative electrodes do not contact with each other.

⟨Electrolytic Solution⟩

The electrolytic solution in the electric double layer capacitor may be a solution of an electrolyte such as tetraethylammonium tetrafluoroborate, triethylmethylammonium tetrafluoroborate or tetraethylammoniumhexafluorophosphate in any of the solvents mentioned with respect to the lithium ion secondary batteries.

⟨Separator⟩

Examples of the separators include those separators which may be used for the lithium ion capacitors.

Although some embodiments of the present invention have been described in detail, these embodiments are only illustrative and various modifications may be added thereto.

EXAMPLES

The present invention will be described by presenting examples hereinbelow without limiting the scope of the invention.

Example 1

Method of Synthesizing Binding Agent (Binder)

A fluorine-containing polymer was synthesized in the following manner. An approximately 6 L volume autoclave equipped with an electromagnetic stirrer was purged with nitrogen. The autoclave was charged with 2.5 L of deoxygenated pure water and 25 g of ammonium perfluorodecanoate as an emulsifier. While the mixture was stirred at 350 rpm, the temperature was increased to 60° C. Thereafter, the internal pressure was increased to 20 kg/cm$^2$G by supplying a mixed gas containing 70 vol % of vinylidene fluoride (VDF) and 30 vol % of propylene hexafluoride (HFP). Polymerization was initiated by injecting, with nitrogen gas, 25 g of a CFC-113 solution containing 20 mass % of diisopropyl peroxydicarbonate as a polymerization initiator. During the polymerization, a mixed gas containing 60.2 vol % of VDF and 39.8 vol % of HFP was injected successively to maintain the internal pressure at 20 kg/cm$^2$G. To remedy a decrease in the polymerization rate with the progress of the polymerization, the same amount as described above of the polymerization initiator was injected with nitrogen gas after a lapse of 3 hours, and the reaction was continuously performed for another 3 hours. Thereafter, the reaction liquid was cooled. At the same time, stirring was terminated and unreacted monomers (the mixed gas) were discharged, thereby terminating the reaction. Thus, a latex was obtained which contained fine particles of a fluorine-containing polymer having a D50 of 120 nm (as measured with laser diffraction/scattering particle size distribution analyzer "LA-950 V2" (manufactured by HORIBA Ltd.)).

$^{19}$F-NMR analysis with respect to the obtained fine particles showed that the mass ratio of the monomers was VDF/HFP=21/4.

Next, a specific polymer composition was prepared in the following manner. A 7 L volume separable flask was thoroughly purged with nitrogen and was charged with 10 parts by mass (in terms of solid content) of the latex containing the component (a), 170 parts by mass of water, and materials for forming a component (b), namely, 0.1 parts by mass of polymerizable emulsifier "ADEKA REASOAP SR 1025" (manufactured by ADEKA CORPORATION), 8.9 parts by mass of methyl methacrylate and 0.4 parts by mass of acrylic acid. Further, 0.3 parts by mass of potassium persulfate and 0.1 parts by mass of sodium sulfite as a polymerization initiator were added. The reaction was carried out at 50° C. for 2 hours.

A separate container was charged with 80 parts by mass of water, and materials for forming a component (b), namely, 0.5 parts by mass of "ADEKA REASOAP SR 1025" (manufactured by ADEKA CORPORATION), 54 parts by mass of 2-ethyl hexyl acrylate, 16.5 parts by mass of methyl methacrylate, 9 parts by mass of styrene and 0.6 parts by mass of acrylic acid. These materials were mixed and homogeneously emulsified to give an emulsion. To the separable flask in which the reaction had been performed at 50° C. for 2 hours, this emulsion was added and the reaction was performed at 50° C. for 3 hours and further at 80° C. for 1 hour. Thereafter, the reaction system was cooled and the reaction was terminated. The pH was adjusted to 7 with an aqueous sodium hydroxide solution. Further, 0.05 parts by mass of anti-foaming agent "NOPCO NXZ" (manufactured by SAN NOPCO LIMITED) was added. Thus, an aqueous dispersion (hereinafter, also referred to as "fluorine acryl [1]") which contained fluorine-containing acrylic polymer particles (D50: 250 nm) was obtained. The particles had a ratio of the component (a) to the component (b) (the component (b) does not include water, the polymerization initiator, sodium sulfite and the anti-foaming agent) of 10 parts by mass:90 parts by mass, and had a complex structure in which the component (a) formed particulate seeds and the component (b) formed outer shells. The obtained aqueous dispersion was used as an aqueous dispersion for positive electrodes and that for negative electrodes.

⟨Production of Positive Electrodes⟩

A method for producing positive electrodes will be described below.

(Example of Preparation of Conductive Coating Material)

Ion exchange water was admixed with 95 parts by mass of carbon powder (D50: 4.5 μm) and 5 parts by mass of carboxymethyl cellulose. Thus, a slurry having a solid concentration of 30% (hereinafter, also referred to as "conductive coating material (1)") was prepared.

(Example of Preparation of Positive Electrode Coating Material)

Ion exchange water was admixed with 87 parts by mass of activated carbon (phenolic type activated carbon with specific surface area of 2030 m$^2$/g and D50 of 4 μm), 4 parts by mass of acetylene black powder, 6 parts by mass (in terms of solid content) of the fluorine acryl [1] and 3 parts by mass of carboxymethyl cellulose. Thus, a slurry having a solid concentration of 35 mass % (hereinafter, also referred to as "positive electrode coating material (1)") was prepared.

(Example of Application to Positive Electrode Collector)

A strip-shaped aluminum foil 200 mm in width and 15 μm in thickness was perforated by punching to form circular throughholes having an opening area of 0.79 mm$^2$ with a local zigzag arrangement. Thus, a collector having an open area ratio of 42% was obtained. The conductive coating material (1) was applied to portions of both surfaces of the collector using a vertical die double-side coating machine under coating conditions where the coating width was 130 mm and the coating rate was 8 m/min to a target coating thickness of the coatings on both sides combined of 20 μM. After the double-side coating, the coatings were dried at 200° C. for 24 hours under reduced pressure to form conductive layers on the front and the back surfaces of the collector.

Thereafter, the positive electrode coating material (1) was applied onto the conductive layers on the front and the back surfaces of the collector using a vertical die double-side coating machine under coating conditions where the coating rate was 3 m/min to a target coating thickness of the coatings on both sides combined of 150 μm. After the double-side coating, the coatings were dried at 200° C. for 24 hours under reduced pressure to form positive electrode active material layers on the conductive layers. During the double-side coating, the positive electrode coating material (1) was applied onto both surfaces of the collector by passing the collector with the conductive layers through two slit dies. In this process, the coating thickness on each side may be controlled by controlling the gap between each slit die and the collector. In this example, the deviation of thicknesses of the coatings on both sides of the positive electrode collector was adjusted to be ±3%.

The multilayer material in which the conductive layers and the positive electrode active material layers were stacked on portions of the strip-shaped collector was cut such that the size of a section in which the conductive layer and the positive electrode active material layer were stacked one on top of the other (hereinafter, also referred to as "coated section") was 38×24 mm, and the size of a section free from the formation of the conductive layer and the positive electrode active material layer (hereinafter, also referred to as "uncoated section")

was 10×4 mm. In this manner, five pieces of positive electrodes depicted in FIG. 1 were manufactured.

⟨Production of Negative Electrodes⟩

A method for producing negative electrodes will be described below.

(Example of Preparation of Negative Electrode Coating Material)

In a planetary mixer, 87 parts by mass of artificial graphite fine powder (manufactured by SHOWA DENKO K.K.: UF-G5) having a D50 of 4.5 μm as measured with a grain size distribution analyzer and 4 parts by mass of acetylene black powder were mixed with each other homogeneously. Thereafter, 68 parts by mass of ion exchange water and 3 parts by mass in terms of solid carboxymethyl cellulose of a 10% aqueous carboxymethyl cellulose solution were added. The mixture was kneaded until it became liquid. Lastly, 6 parts by mass in terms of solid content of the fluorine acryl [1] and 1.5 parts by mass of ion exchange water as an adjuster were added, and the mixture was stirred sufficiently with a mixing stirrer to give a slurry (hereinafter, also referred to as "negative electrode coating material (1)"). The solid concentration in the slurry was 47.5 mass %.

(Example of Application to Negative Electrode Collector)

A strip-shaped copper foil 200 mm in width and 25 μm in thickness was perforated by punching to form circular throughholes having an opening area of 0.79 mm$^2$ with a local zigzag arrangement. Thus, a collector having an open area ratio of 42% was obtained. Here, the converted thickness based on 0% open area ratio was 14.5 μm. The negative electrode coating material (1) was applied onto portions of the collector using a vertical die double-side coating machine under coating conditions where the coating width was 130 mm and the coating rate was 8 m/min to a target coating thickness of the coatings on both sides combined of 80 μm. After the double-side coating, the coatings were dried at 200° C. for 24 hours under reduced pressure to form negative electrode active material layers on the front and the back surfaces of the collector. Here, the density of the negative electrode active material layers was calculated to be 0.89 g/cc according to Equation (iii). (The density of the negative electrode active material layers was measured with respect to a 16 mm diameter circular sample that had been cut from a section in which the negative electrode active material layers were stacked on the collector (hereinafter, also referred to as "coated section"). The open area ratio of the collector of the sample was 42%.

The multilayer material in which the negative electrode active material layers were stacked on portions of the strip-shaped collector was cut such that the size of a coated section was 26×40 mm, and the size of a section free from the formation of the negative electrode active material layer (hereinafter, also referred to as "uncoated section") was 10×4 mm. In this manner, a negative electrode was manufactured. This negative electrode has the same shape as that depicted in FIG. 1 except the size and the absence of conductive layers. Six pieces of negative electrodes were manufactured.

⟨Method for Producing Electrical Storage Devices (Lithium Ion Capacitors)⟩

The five positive electrodes and the six negative electrodes were dried under reduced pressure. After dried, the five positive electrodes and the six negative electrodes were stacked alternately on top of one another through 35 μm thick cellulose separators such that the negative electrodes were on the outermost sides, namely, such that the multilayer structure was negative electrode/separator/positive electrode/separator/negative electrode/separator . . . /positive electrode/separator/negative electrode. Positive electrode terminals and negative electrode terminals were welded to the respective uncoated sections of the positive electrodes and the negative electrodes stacked together. The resultant multilayer structure will be also referred to as "electrode multilayer structure" hereinafter.

A 24×37 mm lithium metal foil with a thickness of 125 μm was pressure bonded to a 26×40 mm expanded copper metal with a thickness of 25 μm similar material to the negative electrode collector. A 10×4 mm lithium electrode terminal was welded to the unit, thereby fabricating a 26×40 mm lithium electrode with a thickness of 150 μm. The electrode multilayer structure was sandwiched between two such lithium electrodes for lithium ion pre-doping such that the surface on which the lithium metal foil was pressure bonded opposed the outermost negative electrode of the electrode multilayer structure. Thus, a lithium ion capacitor element (hereinafter, also referred to as "element") was produced.

The element was covered by being sandwiched between two exterior aluminum laminate films. The ends on three sides of the films were heated and fusion bonded, thereby forming a container. Thereafter, an electrolytic solution (a 1 mol/L solution of LiPF$_6$ in a mixed solvent containing ethylene carbonate, diethyl carbonate and propylene carbonate with a weight ratio of 3:4:1) was poured into the container. The element was impregnated with the electrolytic solution under reduced pressure, and the remaining one side of the films was vacuum sealed. Thus, a lithium ion capacitor cell (S1) was produced. Four such cells (S1) were fabricated.

⟨Methods for Evaluating Cell Properties⟩

(Measurement and Evaluation of Discharge Capacity and Direct-Current Internal Resistance at 25° C.)

The cell was subjected to constant current-constant voltage charging for 1 hour in which the cell was charged at a constant current of 0.2 A at 25° C. until the cell voltage reached 3.8 V and was thereafter charged by the application of a constant voltage of 3.8 V. Next, the cell was discharged at a constant current of 0.2 A until the cell voltage became 2.2 V. This constant current-low voltage charging and subsequent discharging will be also referred to as "3.8 V-2.2 V cycle at 25° C." hereinbelow. The 3.8 V-2.2 V cycle at 25° C. was repeated. In the third discharging, the discharge capacity of the cell was measured and the direct-current internal resistance was calculated based on a voltage drop after 0.1 second immediately after the initiation of discharging.

(Measurement and Evaluation of Discharge Capacity and Direct-Current Internal Resistance at −30° C.)

First, the cell voltage was adjusted to 2.2 V at room temperature. The cell was then allowed to stand in a thermostatic chamber while maintaining the contact with the charge/discharge tester. After at least 3 hours after the indicated temperature of the thermostatic chamber reached −30° C., charging and discharging were carried out under the same conditions as in the measurement and evaluation of discharge capacity and direct-current internal resistance at 25° C., except that the temperature was changed from 25° C. to −30° C. This constant current-low voltage charging and subsequent discharging will be also referred to as "3.8 V-2.2 V cycle at −30° C." hereinbelow. The 3.8 V-2.2 V cycle at −30° C. was repeated. In the third discharging, the discharge capacity of the cell was measured and the direct-current internal resistance was calculated based on a voltage drop after 0.1 second immediately after the initiation of discharging.

(Measurement and Evaluation of Discharge Capacity and Direct-Current Internal Resistance after Floating Test)

The discharge capacity and the direct-current internal resistance were measured and calculated under the same conditions as in the measurement and evaluation of discharge capacity and direct-current internal resistance at 25° C., except that the cell was held at 3.8 V and 70° C. for 1000 hours beforehand (floating test) and was thereafter brought back to room temperature. To evaluate properties after the floating test, a decrease ratio of discharge capacity and an increase ratio of direct-current internal resistance were obtained relative to the discharge capacity and the direct-current internal resistance at 25° C. without the floating test.

The direct-current internal resistance and the discharge capacity at 25° C. or −30° C., and these values after the floating test were measured with respect to the four cells obtained in each of examples and comparative examples. The average values of the four cells are described.

A pre-doping step was carried out in the following manner. Prior to the first application of 3.8 V to the obtained lithium ion capacitor cell, a discharging operation was performed between the negative electrode and the lithium electrode using a charge/discharge tester such that the potential of the negative electrode changed from 3 V to 0.08 V (vs. Li/Li$^+$), thereby electrochemically doping the negative electrode with a predetermined amount of lithium ions.

Table 1 describes the results of the measurements of the direct-current internal resistance and the discharge capacity at 25° C. or −30° C., as well as the ratios of increase in direct-current internal resistance and decrease in discharge capacity after the floating test with respect to the cells in Examples 1 to 4 (S1 to S4) and Comparative Examples 1 to 4 (C1 to C4).

Example 2

Negative electrodes having a density of negative electrode active material layers of 0.77 g/cc were produced in the same manner as in Example 1, except that in the preparation of the negative electrode coating material in Example 1, the amount of ion exchange water as an adjuster was changed to 36.1 parts by mass and the solid concentration in the slurry was changed to 40.8 mass %. In this calculation of the density of the negative electrode active material layers, the collector of the sample had an open area ratio of 42%. Four lithium ion capacitor cells (S2) were produced in the same manner as described in Example 1, except that these negative electrodes were used.

Example 3

The negative electrodes produced in Example 1 were pressed with a roll press machine (manufactured by Oono-Roll Corporation, roll diameter 500 mm) with a roll gap of 60 μm and a roll pressure of 10 t. As a result, the density of the negative electrode active material layers became 1.08 g/cc. In this calculation of the density of the negative electrode active material layers, the collector of the sample had an open area ratio of 42%. Four lithium ion capacitor cells (S3) were produced in the same manner as described in Example 1, except that the pressed negative electrodes were used.

Example 4

Four lithium ion capacitor cells (S4) were produced in the same manner as described in Example 1, except that in the preparation of the negative electrode coating material (1) in Example 1, the artificial graphite fine powder was replaced by graphite (D50=15 μm). The density of the negative electrode active material layers was 0.98 g/cc. In this calculation of the density of the negative electrode active material layers, the collector of the sample had an open area ratio of 42%.

Comparative Example 1

Negative electrodes having a density of negative electrode active material layers of 0.68 g/cc were produced in the same manner as in Example 1, except that in the preparation of the negative electrode coating material in Example 1, the amount of ion exchange water as an adjuster was changed to 88.4 parts by mass and the solid concentration in the slurry was changed to 33.6 mass %. In this calculation of the density of the negative electrode active material layers, the collector of the sample had an open area ratio of 42%. Four lithium ion capacitor cells (C1) were produced in the same manner as described in Example 1, except that these negative electrodes were used.

Comparative Example 2

The negative electrodes produced in Example 1 were pressed with a roll press machine (manufactured by Oono-Roll Corporation, roll diameter 500 mm) with a roll gap of 0 μm and a roll pressure of 10 t. As a result, the density of the negative electrode active material layers became 1.20 g/cc. In this calculation of the density of the negative electrode active material layers, the collector of the sample had an open area ratio of 42%. Four lithium ion capacitor cells (C2) were produced in the same manner as described in Example 1, except that the pressed negative electrodes were used.

Comparative Example 3

Four lithium ion capacitor cells (C3) were produced in the same manner as described in Example 1, except that in the preparation of the negative electrode coating material (1) in Example 1, the fluorine acryl [1] was replaced by an acryl [2] described below. The density of the negative electrode active material layers was 0.88 g/cc. In this calculation of the density of the negative electrode active material layers, the collector of the sample had an open area ratio of 42%.

The acryl [2] was an emulsion which contained a copolymer of methyl acrylate and acrylonitrile with a copolymerization molar ratio of 7:3. The solid content was 40 wt % relative to the total weight of the acryl [2].

Comparative Example 4

Four lithium ion capacitor cells (C4) were produced in the same manner as described in Example 1, except that in the preparation of the negative electrode coating material (1) in Example 1, the fluorine acryl [1] was replaced by SBR [3] described below. The density of the negative electrode active material layers was 0.89 g/cc. In this calculation of the density of the negative electrode active material layers, the collector of the sample had an open area ratio of 42%.

SBR [3]: TRD 2001 manufactured by JSR CORPORATION

TABLE 1

| Cells | Negative electrode active material Active material | Negative electrode active material D50 [μm] | Negative electrode active material Binder | Density of negative electrode active material layers [g/cc] | Direct-current internal resistance [mΩ] 25° C. | Direct-current internal resistance [mΩ] −30° C. | Discharge capacity [mAh] 25° C. | Discharge capacity [mAh] −30° C. | Properties after floating test Ratio of increase in direct-current internal resistance [%] 25° C. | Properties after floating test Ratio of decrease in discharge capacity [%] 25° C. |
|---|---|---|---|---|---|---|---|---|---|---|
| S1 | Graphite fine powder | 4.5 | Fluorine acryl [1] | 0.89 | 66 | 2410 | 26 | 23 | 8 | 3 |
| S2 | Graphite fine powder | 4.5 | Fluorine acryl [1] | 0.77 | 69 | 2520 | 26 | 22 | 9 | 3 |
| S3 | Graphite fine powder | 4.5 | Fluorine acryl [1] | 1.08 | 68 | 2480 | 26 | 22 | 8 | 4 |
| S4 | Graphite | 15 | Fluorine acryl [1] | 0.98 | 72 | 2600 | 25 | 20 | 6 | 2 |
| C1 | Graphite fine powder | 4.5 | Fluorine acryl [1] | 0.68 | 74 | 2700 | 26 | 20 | 12 | 7 |
| C2 | Graphite fine powder | 4.5 | Fluorine acryl [1] | 1.20 | 73 | 2660 | 26 | 22 | 13 | 8 |
| C3 | Graphite fine powder | 4.5 | Acryl [2] | 0.88 | 70 | 2560 | 26 | 21 | 15 | 9 |
| C4 | Graphite fine powder | 4.5 | SBR [3] | 0.89 | 79 | 3810 | 26 | 18 | 9 | 3 |

The cells S1 to S4 exhibited a small increase ratio in direct-current internal resistance and a small decrease ratio in discharge capacity after the floating test. These results are probably because the negative electrode active material layers contained the fluorine-containing acrylic binder as well as because the density of the negative electrode active material layers was in the appropriate range. Further, the values of direct-current internal resistance at 25° C. or −30° C. were low. That is, these cells maintained a high discharge capacity even at −30° C. Furthermore, it was demonstrated that the cells tended to exhibit a low direct-current internal resistance when the negative electrode active material layers contained an active material having a D50 of not more than 10 μm. This result is probably because the use of an active material having a small D50 led to an increased outer surface area of the negative electrode active material layers.

The cells C1 exhibited a large increase ratio in direct-current internal resistance and a large decrease ratio in discharge capacity after the floating test. These results are probably because the density of the negative electrode active material layers in the cells C1 was as low as 0.68 g/cc, and the negative electrode active material layers exhibited low adhesion with respect to the collector and had become partially separated from the collector. Further, the values of direct-current internal resistance at 25° C. or −30° C. of the cells C1 were slightly larger than the values of direct-current internal resistance of the cells S1 to S3. The discharge capacity at −30° C. of the cells C1 was lower than the discharge capacities of the cells S1 to S3. These results are probably because the electron conductivity of the cells C1 was low due to the low density of the negative electrode active material layers of the cells.

Similarly, the cells C2 exhibited a large increase ratio in direct-current internal resistance and a large decrease ratio in discharge capacity after the floating test. These results are probably because the amount of impregnation with the electrolytic solution was small due to the negative electrode active material layers of the cells C2 having as high a density as 1.2 g/cc. Further, the values of direct-current internal resistance of the cells C2 were slightly larger than the values of direct-current internal resistance of the cells S1 to S3. Similarly, these results are probably because the amount of impregnation with the electrolytic solution was small due to the negative electrode active material layers of the cells C2 having such a high density.

The cells C3 exhibited only slightly higher direct-current internal resistance compared to the values of direct-current internal resistance of the cells S1 to S3, but showed a large increase ratio in direct-current internal resistance after the floating test. This result demonstrates that the cells exhibit excellent properties (higher reliability) after a floating test when the negative electrode active material layers utilize a fluorine-containing acrylic binder compared to an acrylic binder. This effect is probably obtained because a fluorine-containing acrylic binder has higher redox resistance.

The cells C4 had a large discharge capacity at 25° C. and exhibited excellent properties after the floating test. However, they had high direct-current internal resistance and a small discharge capacity at −30° C. When the binder SBR [3] is used in the formation of negative electrode active material layers, the transfer of electrons from active material particles is suppressed due to the binder forming a coat on the surface of the active material particles. This fact probably caused an increase in charge transfer resistance at the interface of the active material, resulting in high direct-current internal resistance of the cells.

INDUSTRIAL APPLICABILITY

The electrical storage devices of the present invention are highly useful as driving or supplementary capacitors for vehicles such as electric vehicles and hybrid electric vehicles. Further, the electrical storage devices of the invention may be suitably used as driving capacitors for vehicles such as electric bicycles and electric wheelchairs, various energy capacitors such as solar energy capacitors and wind power capacitors, and capacitors of home electric appliances.

REFERENCE SIGNS LIST

1: COATED SECTION
2: UNCOATED SECTION

3: POSITIVE ELECTRODE ACTIVE MATERIAL LAYER
4: CONDUCTIVE LAYER
5: COLLECTOR

The invention claimed is:

1. An electrical storage device comprising
a positive electrode, and
a negative electrode comprising a negative electrode active material layer, said negative electrode active material layer comprising an acrylic binder comprising fluorine, wherein the negative electrode active material layer has a density of 0.75 g/cc to 1.10 g/cc, and
wherein the acrylic binder comprising fluorine comprises a polymer composition comprising:
component (a): a polymer comprising fluorine, and
component (b): an acrylic polymer comprising a structural unit derived from an alkyl (meth)acrylate.

2. The electrical storage device of claim 1, wherein the polymer composition comprises 5 to 20 mass % of the component (a) and 80 to 95 mass % of the component (b), wherein a total amount of the component (a) and the component (b) is 100 mass %.

3. The electrical storage device of claim 1, wherein the polymer composition has a structure in which the component (a) forms a particulate seed and the component (b) forms an outer shell.

4. The electrical storage device of claim 1, wherein the negative electrode active material layer further comprises at least one active material selected from the group consisting of a graphite, a non-graphitizable carbon, a graphitizable carbon, a coke and a polyacene-based organic semiconductor, wherein the at least one active material has a 50% volume cumulative diameter (D50) in a range of 0.5 to 10 μm.

5. The electrical storage device of claim 4, wherein the negative electrode active material layer comprises a graphite.

6. The electrical storage device of claim 4, wherein the negative electrode active material layer comprises a non-graphitizable carbon.

7. The electrical storage device of claim 4, wherein the negative electrode active material layer comprises a graphitizable carbon.

8. The electrical storage device of claim 4, wherein the negative electrode active material layer comprises a coke.

9. The electrical storage device of claim 4, wherein the negative electrode active material layer comprises a polyacene-based organic semiconductor.

10. The electrical storage device of claim 1, wherein the electrical storage device is a lithium ion capacitor.

11. A negative electrode suitable for use in a lithium ion capacitor, the negative electrode comprising a negative electrode active material layer comprising an acrylic binder comprising fluorine,
wherein the acrylic binder comprising fluorine comprises a polymer composition comprising:
component (a): a polymer comprising fluorine, and
component (b): an acrylic polymer comprising a structural unit derived from an alkyl (meth)acrylate.

12. The negative electrode of claim 11, wherein the negative electrode active material layer has a density of 0.75 g/cc to 1.10 g/cc.

13. The negative electrode of claim 11, wherein the polymer composition comprises 5 to 20 mass % of the component (a) and 80 to 95 mass % of the component (b), wherein a total amount of the component (a) and the component (b) is 100 mass %.

14. The negative electrode of claim 11, wherein the polymer composition has a structure in which the component (a) forms a particulate seed and the component (b) forms an outer shell.

15. The negative electrode of claim 11, wherein the negative electrode active material layer further comprises at least one active material selected from the group consisting of a graphite, a non-graphitizable carbon, a graphitizable carbon, a coke and a polyacene-based organic semiconductor, wherein the at least one active material has a 50% volume cumulative diameter (D50) in a range of 0.5 to 10 μm.

16. A binder suitable for use in a negative electrode of a lithium ion capacitor, the binder comprising a polymer composition comprising:
component (a): a polymer comprising fluorine, and
component (b): an acrylic polymer comprising a structural unit derived from an alkyl (meth)acrylate.

17. The binder of claim 16, wherein the polymer composition comprises 5 to 20 mass % of the component (a) and 80 to 95 mass % of the component (b), wherein a total amount of the component (a) and the component (b) is 100 mass %.

18. The binder of claim 16, wherein the polymer composition has a structure in which the component (a) forms a particulate seed and the component (b) forms an outer shell.

* * * * *